United States Patent
Jia et al.

(10) Patent No.: US 12,445,870 B2
(45) Date of Patent: Oct. 14, 2025

(54) WIFI SCANING ENHANCEMENT

(71) Applicant: HEWLETT PACKARD ENTERPRISE DEVELOPMENT LP, Spring, TX (US)

(72) Inventors: Xuguang Jia, Beijing (CN); Qiang Zhou, Santa Clara, CA (US); Xiaoyang Fu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 316 days.

(21) Appl. No.: 18/449,126

(22) Filed: Aug. 14, 2023

(65) Prior Publication Data

US 2025/0063384 A1 Feb. 20, 2025

(51) Int. Cl.
*H04W 24/02* (2009.01)
*H04W 24/08* (2009.01)
*H04W 24/10* (2009.01)

(52) U.S. Cl.
CPC ........... *H04W 24/02* (2013.01); *H04W 24/08* (2013.01); *H04W 24/10* (2013.01)

(58) Field of Classification Search
CPC ...... H04W 24/02; H04W 24/08; H04W 24/10
See application file for complete search history.

(56) References Cited

U.S. PATENT DOCUMENTS

| 8,904,276 B2 | 12/2014 | Beutnagel et al. |
| 2014/0079043 A1* | 3/2014 | Montemurro ..... H04W 52/0216 370/338 |
| 2021/0007168 A1 | 1/2021 | Asterjadhi et al. |
| 2022/0039180 A1 | 2/2022 | Mukherjee et al. |
| 2022/0116957 A1 | 4/2022 | Cariou et al. |
| 2022/0116994 A1 | 4/2022 | Chen et al. |
| 2022/0182119 A1 | 6/2022 | Ravichandran et al. |
| 2022/0322219 A1 | 10/2022 | Gandhi et al. |

FOREIGN PATENT DOCUMENTS

| WO | 2021/162234 A1 | 8/2021 |
| WO | 2022/081873 A1 | 4/2022 |
| WO | 2022/179696 A1 | 9/2022 |

\* cited by examiner

*Primary Examiner* — Duc C Ho
(74) *Attorney, Agent, or Firm* — Hewlett Packard Enterprise Patent Department

(57) ABSTRACT

A method for scanning enhancement is provided. The method comprises receiving a channel scan request, including a scan channel number, a bandwidth, and a total scan time. The method further comprises determining a number of a plurality of scans based on the total scan time and an individual scan time for an AP. The method further comprises determining a plurality of offset values corresponding to the plurality of scans based on the number of the plurality of scans. In addition, the method further comprises performing off-channel scanning based on the scan channel number, the bandwidth, the number of the plurality of scans, and the plurality of offset values. Implementations of the present disclosure can improve the effect and the efficiency of the scanning process, the performance of the features of the upper layer, and the user experience.

20 Claims, 12 Drawing Sheets

WIFI SCANING ENHANCEMENT

BACKGROUND

Off-channel scanning is when a Wi-Fi client device tunes its radio to another channel to look for available access points (APs) or scans for APs on a channel to which it is not connected. On the one hand, a Wi-Fi client device scans the off-channel APs looking for a suitable AP to connect to in case it needs to roam from its current AP. On the other hand, an AP can also perform off-channel scanning. This process is the same as off-channel scanning for Wi-Fi client devices and essentially allows the AP to tune its radio to a different channel for a finite amount of time. Off-channel scanning is typically used as a method to detect sources of interference, rogue, or unauthorized ad-hoc Wi-Fi networks.

Multi-link operation (MLO) is a Wi-Fi technology that enables devices connected to an AP to simultaneously send and/or receive data across different frequency bands and channels. MLO technology is one of the core features added in Wi-Fi 7 that help enhance the user experience by handling wireless connections more efficiently.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
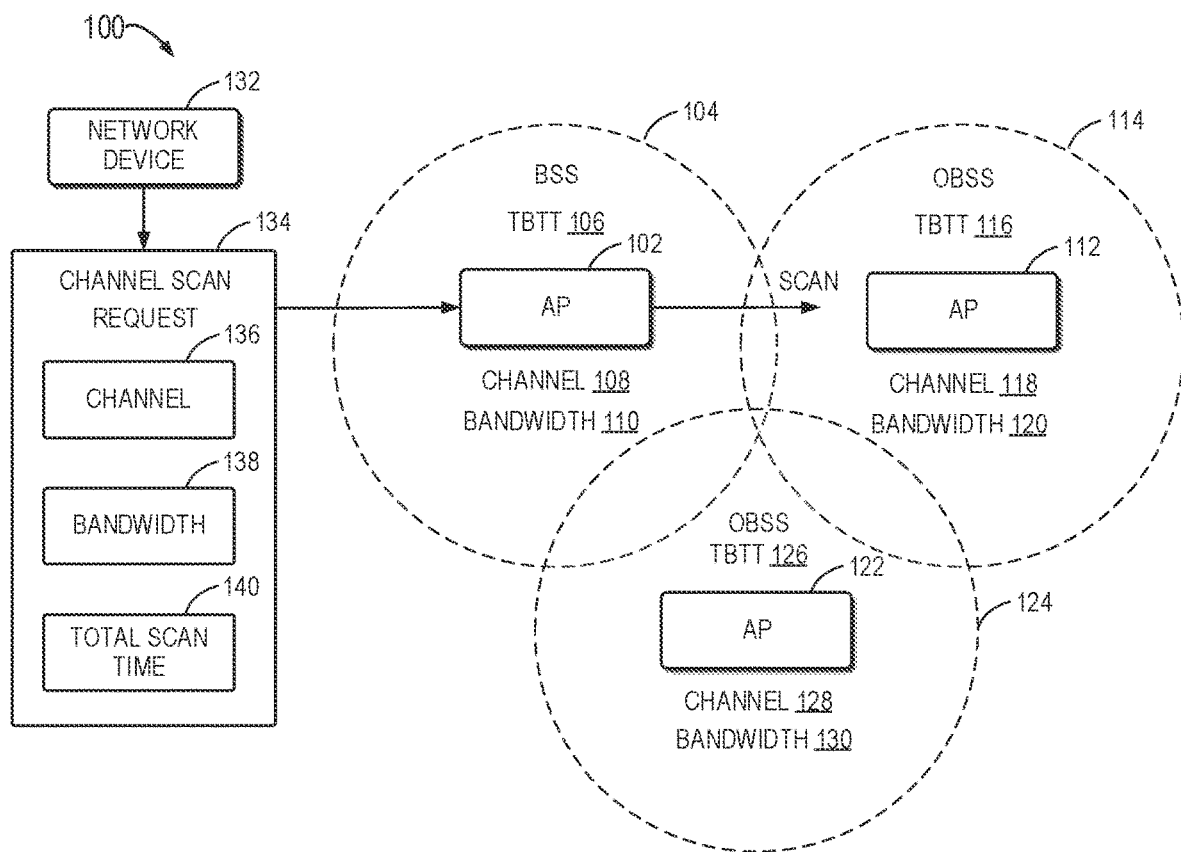
FIG. 1 illustrates an example environment in which example implementations of the present disclosure may be implemented.

Wi-Fi scanning provides basic monitored packets to the upper layer (e.g., a controller, a cloud application, etc.), and some features of the controller or the cloud application (e.g., intrusion detection, channel assignment, dynamic bandwidth adjustments, automated power adjustment, etc.) depend on analytical materials collected by applying proper scanning algorithms.

MLO technology is one of the core features added in Wi-Fi 7 that help enhance the user experience by handling wireless connections more efficiently. MLO enables a non-AP multi-link device (MLD) to discover, authenticate, associate, and set up multiple links with an AP MLD, and each of the multiple links enables channel access and frames exchanges between a non-AP MLD and an AP MLD.

Dwell time (also referred to as individual scan time herein) is a duration time for which an AP or wireless device listens and scans on a nearby channel during off-channel scanning process. In other words, the dwell time determines how long the AP stays on a channel before moving on to the next one. For non-MLD AP, the traditional scanning feature only concerns a single link and uses static dwell time for off-channel scanning. For example, background scanning is a feature that allows the AP to periodically scan the beacons on nearby channels while continuing to serve client devices with their regular network activities. However, the background scanning periodically scans the target channel for a certain dwell time, which results in the beacons on the target channel may not always be captured.

For example, a target beacon transmission time (TBTT) of a basic service set (BSS) managed by an AP and a TBTT of a neighbor BSS are both 100 ms, and the dwell time is 30 ms. If the AP switches to the channel of the neighbor BSS for scanning at 5 ms after transmitting beacons in the BSS of the AP, then the AP will leave the scanning channel at 35 ms. However, if the beacon in the neighbor BSS is transmitted at 40 ms after the beacon in the BSS of the AP is transmitted, the AP may always fail to capture the beacons in the neighbor BSS.

Therefore, the implementations of the present disclosure provide a scanning enhancement scheme. The scheme may determine the information of a scan channel (e.g., including a scan channel number and a bandwidth) and a total scan time. Then, the scheme may determine a number of scans based on the total scan time and dwell time for the AP and a set of offset values for these scans based on the number of scans. Furthermore, the AP may perform off-channel scanning based on the information of the scan channel, the number of scans, and the set of offset values.

In this manner, no matter when the beacons in the neighbor BSS are transmitted, and no matter how long the dwell time is, the scheme provided by the implementations of the present disclosure can ensure that the beacons in the neighbor BSS can be captured by the AP within a certain number of scans. Thus, the effect and efficiency of the scanning process can be improved. Because the scanning process is enhanced, the performance of the features of the upper layer can be improved, and the user experience can be improved as well. Other advantages of implementations of the present disclosure will be described with reference to example implementations as described below. Basic principles and several example implementations of the present disclosure herein are illustrated with reference to FIG. 1 through FIG. 10 as follows.

FIG. 1 illustrates an example environment 100 in which example implementations of the present disclosure may be implemented. As shown in FIG. 1, the environment 100 includes a BSS 104, an overlapping BSS (OBSS) 114, and an OBSS 124. The BSS 104 is managed by an AP 102, a TBTT of the BSS 104 is TBTT 106 (e.g., 100 ms), and the AP 102 is working on channel 108 with bandwidth 100 (e.g., 2.4 GHz, 5 GHz, or 6 GHz). The OBSS 104 is managed by an AP 112, a TBTT of the OBSS 114 is TBTT 116, and the AP 112 is working on channel 118 with bandwidth 120. The OBSS 124 is managed by an AP 122, a TBTT of the OBSS 124 is TBTT 126, and the AP 122 is working on channel 128 with bandwidth 130. The environment 100 further includes a network device 132, and the network device 132 may be a controller, a server, or a cloud application.

As shown in FIG. 1, the network device 132 may run scanning algorithms in a proper time period and send a channel scan request 134 for off-channel scanning to the AP 102. The channel scan request includes a channel number 136 and a bandwidth 138, indicating that the AP 102 needs to scan on channel number 136 with bandwidth 138. The channel scan request also includes a total scan time 140 indicating the total time that the AP 102 needs to scan on the channel number 136 with bandwidth 138. For example, the channel number 136 may be channel 118, the bandwidth 138 may be the bandwidth 120, and the total scan time 140 may be 110 ms, and it means that the AP 102 is requested to switch to the channel 118 with the bandwidth 120 to perform one or more scans, and the total time of the one or more scans is 100 ms. It should be noted that the environment 100 is an exemplary environment. In some implementations, the channel scan request 134 may include more information, e.g., a number of a plurality scans, and a set of offset values. In some implementations, the channel scan request 134 may include less information, e.g., the channel scan request 134 may do not include total scan time 140.

In some implementations, the AP 102 may receive the channel scan request 134 from the network device 132, including the scan channel number 136, the bandwidth 138, and the total scan time 140, and the total scan time 140 should be greater than the TBTT 116 of the neighbor OBSS 114 or the TBTT 126 of the neighbor OBSS 124. Then, the AP 102 may determine a number of scans based on the total scan time 140 and a dwell time for the AP 102, the dwell time indicating an amount of time that the AP 102 stays on a channel during a scanning process. Furthermore, the AP 102 may determine a set of offset values corresponding to the scans based on the number of scans. Furthermore, the AP 102 may perform off-channel scanning based on the scan channel number 136, the bandwidth 138, the number of scans, and the set of offset values.

In some implementations, the AP 102 may perform a first scan with a first offset value on a target channel indicated by the scan channel number 136 and the bandwidth 138, and may perform a second scan with a second offset value on the same channel. In some implementations, the set of offset values is less than the TBTT 116 of the OBSS 114 and the TBTT 126 of the OBSS 124. In some implementations, in response to determining the time that the AP 102 needs to transmit a beacon on a home channel, the AP 102 may interrupt performance of a third scan. In some implementations, the AP 102 may determine a sum of time of the scans, and the sum of time should be greater than or equal to the total scan time 140.

Figure 2:
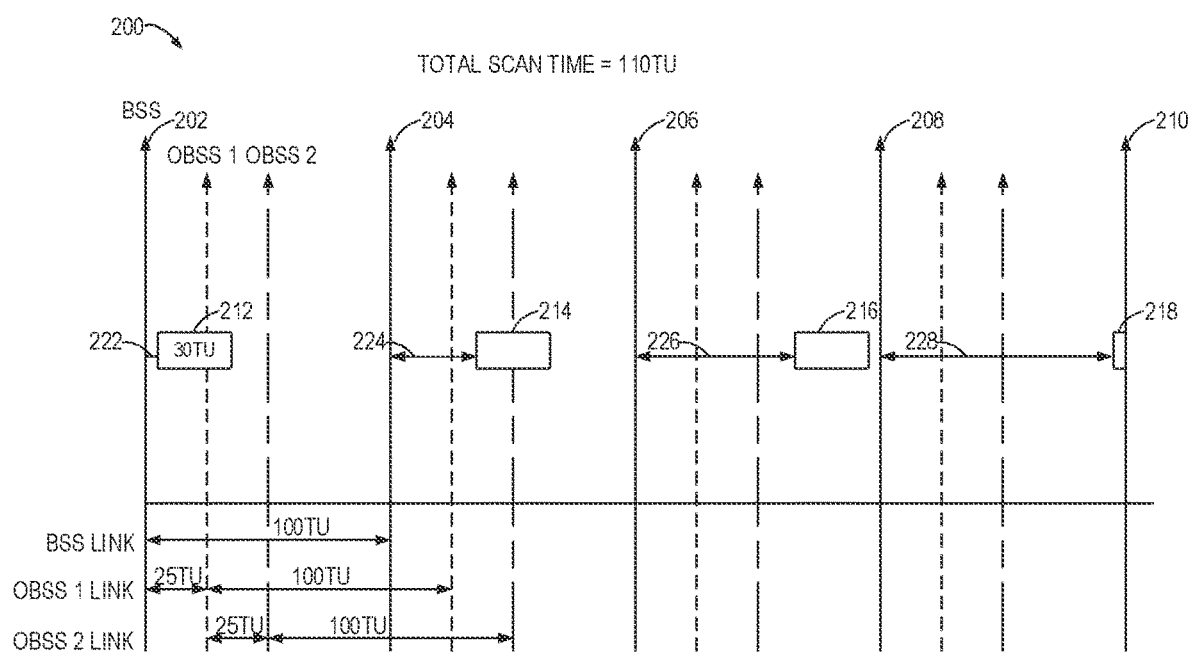
FIG. 2 is a schematic diagram illustrating an example process of performing scans with offsets according to the implementations of the present disclosure.

FIG. 2 is a schematic diagram illustrating an example process 200 of performing scans with offsets according to the implementations of the present disclosure. As shown in FIG. 2, the TBTT of the BSS (e.g., the TBTT 106 of the BSS 104 in FIG. 1), the TBTT of the OBSS 1 (e.g., the TBTT 116 of the OBSS 114 in FIG. 1) and the TBTT of the OBSS 2 (e.g., the TBTT 126 of the OBSS 124 in FIG. 1) are 100 time units (TU). The beacon transmission times of the BSS are time 202, 204, 206, 208, and 210, the beacon transmission times of the OBSS 1 are 25 TU after the beacon transmission times of the BSS, and the beacon transmission times of the OBSS 2 are 25 TU after the beacon transmission times of the OBSS 1. In the process 200, the network device (e.g., the network device 132 in FIG. 1) may determine a total scan time greater than the TBTT of OBSS 1 and the TBTT of OBSS 2. For example, because the TBTT of OBSS 1 and the TBTT of OBSS 2 are both 100 TU, the process 200 may determine the total scan time as 110 TU. In the example of FIG. 2, the AP in the BSS are configured with 30 TU static dwell time, thus the process 200 may determine four scans (i.e., scan 212, 214, 216 and 218) to fulfill the total scan time.

Furthermore, to ensure that the beacons from the OBSS 1 and the OBSS 2 can be captured by scan 212, 214, 216, or 218, the process 200 may determine offsets for each scan. For example, as shown in FIG. 2, the process determines offset 212 (i.e., 0 after beacon transmission time of the BSS) for scan 212, offset 224 (i.e., 30 TU after beacon transmission time of the BSS) for scan 214, offset 226 (i.e., 60 TU after beacon transmission time of the BSS) for scan 216, and offset 228 (i.e., 90 TU after beacon transmission time of the BSS) for scan 218. It should be noted that the offset values 0, 30 TU, 60 TU, and 90 TU are an example set of offset values with 30 TU dwell time. However, the set of offset values can also be other combination, for example, the offset values 0, 25 TU, 50 TU, and 75 TU with 30 TU dwell time can also fulfill the total scan time. In this manner, the AP can capture the beacons of OBSS 1 during the scan 212, and the AP can capture the beacons of OBSS 2 during the scan 214.

In some implementations, the process 200 may determine a sum of time of the plurality of scans, and the number of the plurality of scans should satisfy that the sum of time is greater than or equal to the total scan time. For example, as shown in FIG. 2, the dwell time is 30 TU, and the total scan time is 110 TU, and when the process 200 is determining the number of the plurality of scans, the sum of time of the plurality of scans should be greater than or equal to 110 TU. Thus the number should be greater than or equal to four (the sum of time of four scans is 120 TU which is greater than the total scan time). In other words, the number of the plurality of scans should satisfy a limitation as shown in equation (1) below:

$$T_{total-scan-time} \leq D \times N. \quad (1)$$

Where $T_{total-scan-time}$ denotes the total scan time, D denotes the dwell time, and N denotes the number of the plurality of scans.

In some implementations, the offset value of the plurality of offset values should be less than all the TBTT of the OBSSs. For example, as shown in FIG. 2, the offset 222, 224, 226, and 228 should be less than 100 TU (the TBTT of the OBSS 1 and the TBTT of the OBSS 2 are both 100 TU). In other words, the plurality of offset values corresponding to the plurality of scans should satisfy a limitation as shown in equation (2) at below:

$$\{Offset_i | 1 \leq i \leq N|\} = [0, MAX\_TBTT_{OBSS}). \quad (2)$$

Where Offset$_i$ denotes the i th offset value, and MAX_TBTT$_{OBSS}$ denotes the maximum TBTT of the OBSSs.

In some implementations, if it is time for the AP to return to its own BSS to transmit a beacon, but the AP is scanning on other channels at this time, the AP may interrupt the scanning on other channels and return to its own BSS. For example, as shown in FIG. 2, the AP needs to return to the BSS to transmit a beacon, but the scan 218 is still in progress, then the AP may interrupt the scan 218 and return to the BSS.

In this manner, the AP performs a plurality of scans with a plurality offset values on the same channel to ensure that the beacons of the OBSSs can be captured by the AP within a certain number of scans. Thus, the performance of the scanning process can be improved. Because the scanning process is enhanced, the features of the upper layer can be enhanced as well, and the user experience can be improved.

Four traffic types are defined in the 802.11e protocol, which are voice, video, best-efforts, and background. Traffic with different traffic types have different requirements for latency, for example, the voice traffic have the highest latency requirements, followed by the video traffic, the background traffic again, and the best-efforts traffic have the lowest latency requirements. Therefore, for voice traffic, long dwell time is not acceptable, and scan rejects or traffic jitters occur. Therefore, in some implementations, the dwell time may be tuned dynamically based on the traffic type of the traffic flow.

In some implementations, the method according to some implementations of the present disclosure may determine a traffic type of a traffic flow over the network associated with the AP, and then the method may determine a dwell time for the traffic flow based on the traffic type of the traffic flow. In some implementations, the dwell time for the best-effort traffic is greater than or equal to the dwell time for the background traffic, the dwell time for the background traffic is greater than or equal to the dwell time for the video traffic, and the dwell time for the video traffic is greater than or equal to the dwell time for the voice traffic. In some implementations, the determined dwell times are less than or equal to the TBTT of the BSS managed by the AP.

Figure 3:
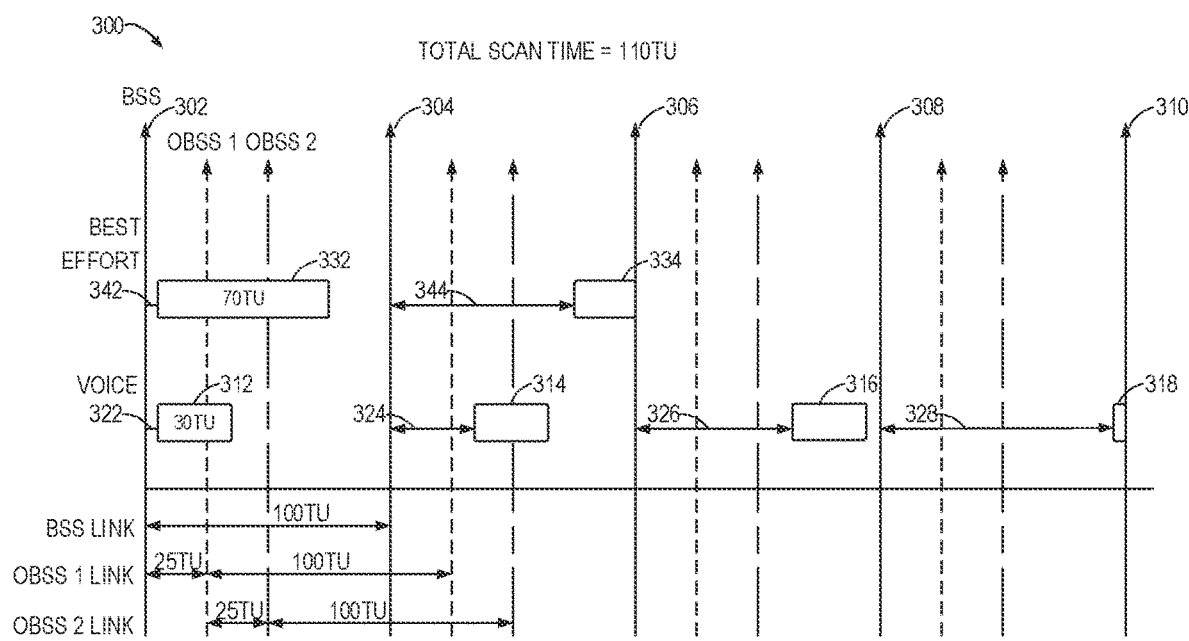
FIG. 3 is a schematic diagram illustrating an example process of performing scans with offsets by tuning the dwell time of the AP according to the implementations of the present disclosure.

FIG. 3 is a schematic diagram illustrating an example process 300 of performing scans with offsets by tuning dwell time of the AP according to the implementations of the present disclosure. As shown in FIG. 3, the TBTT of the BSS, the TBTT of the OBSS 1, and the TBTT of the OBSS 2 are 100 TU. The beacon transmission times of the BSS are time 302, 304, 306, 308, and 310, the beacon transmission times of the OBSS 1 are 25 TU after the beacon transmission times of the BSS, and the beacon transmission times of the OBSS 2 are 25 TU after the beacon transmission times of the OBSS 1. The process 300 may determine the traffic type of the traffic flow. If the traffic type is voice, the process 300 may determine a short dwell time (e.g., 30 TU) for the voice traffic because the voice traffic have the highest latency requirements. If the traffic type is best-effort, the process 300 may determine a longer dwell time (e.g., 70 TU) for the best-effort traffic because the best-effort traffic have lower latency requirements than the voice traffic. The relationship between the dwell time and the traffic type should satisfy a limitation as shown in equation (3) below:

$$D_{BE} \ge D_{BK} \ge D_{VI} \ge D_{VO}. \quad (3)$$

Where $D_{BE}$ denotes the dwell time for the best-effort traffic, $D_{BK}$ denotes the dwell time for the background traffic, $D_{VI}$ denotes the dwell time for the video traffic, and $D_{VO}$ denotes the dwell time for the voice traffic.

In some implementations, in order to keep the network activities of the clients in the BSS managed by the AP, the dwell times for staying on other channels should be less than or equal to the TBTT of the BSS managed by the AP. For example, as shown in FIG. 3, the dwell time for the voice traffic and the dwell time for the best-effort traffic should be less than the TBTT of the BSS (100 TU). In other words, the tuned dwell time should satisfy a limitation as shown in equation (4) below:

$$D \le TBBT_{BSS}. \quad (4)$$

Where TBTT$_{BSS}$ denotes the TBTT of the BSS managed by the AP.

In order to fulfill the total scan time (110 TU) and according to the equation (1), the process 300 may determine that four scans (e.g., scan 312, 314, 316, and 318) should be performed if the traffic type is voice, and determine that two scans (e.g., scan 332 and 334) should be performed if the traffic type is best-effort. Furthermore, according to the equation (2), the process 300 may determine the offsets 322, 324, 326, and 328 corresponding to the scans 312, 314, 316, and 318 for voice traffic, and may determine the offsets 342 and 344 corresponding to the scans 332 and 334 for best-effort traffic. Therefore, for voice traffic, the AP may capture the beacons of OBSS 1 during the scan 312, and the AP may capture the beacons of OBSS 2 during the scan 314. For best-effort traffic, the AP may capture the beacons of OBSS 1 or the beacons of OBSS 2 during the scan 332.

This manner ensures that the beacons of the OBSSs can be captured by the AP. Furthermore, for latency-sensitive traffic, the AP may switch to other channels for a shorter dwell time. Thus, the latency can be decreased, and the user experience can be improved. For latency-insensitive traffic, the AP may switch to other channels for a longer dwell time, and the number of scans can be decreased. Therefore, the unavoidable switching time consumption (including the time consumption of switching from the BSS to the OBSS and the time consumption of switching from the OBSS back to the BSS) can be reduced, and the performance of the network can be improved.

As mentioned above, a shorter dwell time corresponds to a bigger number of scans, which means that the AP needs to switch more times between the BSS and the OBSS, leading to more switching time consumption. For example, if the dwell time is 60 ms, the operations of switching out and back to the home channel may consume about 10 ms. In some implementations, the performance of the network can be improved by using long dwell times which are greater than or equal to the TBTT of the BSS.

The traffic identifier (TID)-to-link mapping mechanism allows an AP MLD and a non-AP MLD that performed multi-link setup to determine how TIDs are mapped to the setup links in downlink (DL) and in uplink (UL). By default, all TIDs shall be mapped to all setup links for both DL and UL. When a mandatory mapping is implicitly negotiated by an announcement by the AP MLD in its transmitted beacons and probe responses, or both MLDs have explicitly negotiated a TID-to-link mapping, each TID can be mapped to the same or different link set. A setup link is defined as enabled if at least one TID is mapped to that link and is defined as disabled if no TIDs are mapped to that link. By default, as TIDs are mapped to all setup links, all setup links shall be enabled. If a link is disabled between MLDs in a BSS, it shall not be used for frame exchange between the MLDs, including management frames both for DL and UL. If an AP MLD link advertises a link to be disabled, the link shall not be used for transmitting management frames by an unassociated non-AP MLD to the AP MLD.

There are Ethernet (ETH) clients and non-ETH clients on an MLD link, and only ETH clients support TID-to-link mapping. In some implementations, the method, according to some implementations of the present disclosure, may determine a proportion of Ethernet clients on a link to all clients on the link. Furthermore, if the method determines that the proportion is greater than a predefined threshold value, then the method may determine a scan time greater than or equal to the TBTT of the BSS managed by the AP as the dwell time, and the method may tune traffic of all the clients on the link to other links by applying TID-to-link mapping.

Figure 4:
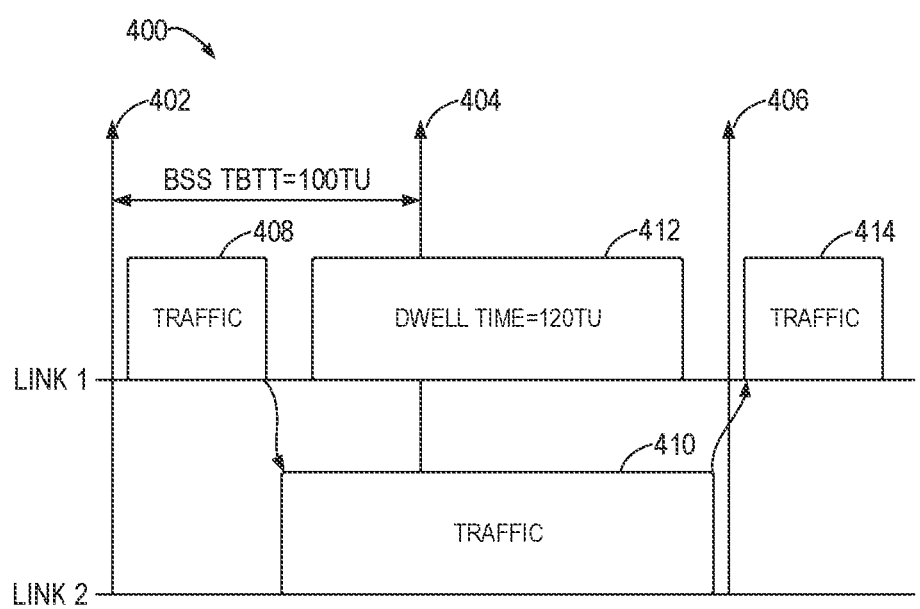
FIG. 4 is a schematic diagram illustrating an example process of performing a scan with a long dwell time according to the implementations of the present disclosure.

FIG. 4 is a schematic diagram illustrating an example process 400 of performing a scan with a long dwell time according to the implementations of the present disclosure. As shown in FIG. 4, the TBTT of the BSS is 100 TU, and the beacon transmission times of the BSS are time 402, 404, and 406. There are several clients, including ETH clients and non-ETH clients, on the link 1. The process 400 may determine a proportion of a number of ETH clients on the link 1 to a total number of clients on the link 1. If the proportion is greater than a predefined threshold value (e.g., 90%, 95%, 98%, etc.), it means that most of the clients on the link 1 are ETH clients, and then the process 400 may determine the dwell time as a value greater than or equal to the TBTT of the BSS. For example, in FIG. 4, the TBTT of the BSS is 100 TU. Therefore, the dwell time can be 120 TU. In some implementations, the dwell time may be greater than the TBTT of the OBSS, such that the beacons in the OBSS can be captured through only one scan. Thus, the switching time consumption can be minimized.

As shown in FIG. 4, the TIDs of traffic are mapped to the link 1 at the beginning, if the AP switches to other OBSS to perform scan 412 for 120 TU, then the beacon transmission at time 404 will be missed. In order to keep the network activities of the clients on the link 1, in some implementations, the process 400 may tune the traffic to other active MLD links by mapping the TIDs of the traffic to the active MLD links. In some other implementations, the process 400 may disable or suspend the current link and notify associated clients with link management frames. For example, the process 400 may tune the traffic on the link 1 to the link 2, which is an active link, by mapping the TIDs of the traffic to the link 2 before the AP switching to other OBSS. When the scan 412 is completed, the AP may switch back to the BSS, and the process 400 may tune the traffic back to the link 1. As shown in FIG. 4, the traffic 408 are on the link 1, the traffic 410 are tuned to the link 2 which allows the AP performing scan 412 in other OBSS, and the traffic 414 are tuned back to the link 1 after the scan 412 is completed.

This manner ensures that the beacons of the OBSSs can be captured by the AP, and the number of the scans can be reduced. In some implementations, the number of the scans can be reduced to one when the dwell time is larger than the TBTT of the OBSS. Therefore, the switching time consumption can be reduced, such that the scanning efficient can be improved. Furthermore, the impact to the network activities can be minimized.

A power save (PS) mode is a feature available in MLDs and client devices in a wireless network. When an MLD or client device enters PS mode, it temporarily disables its radio transmitter and receiver for specific intervals or periods. During these sleep periods, the device is not actively communicating with the AP or the wireless network. In some implementations, for active MLD links that are not in PS mode, there should be at least one active link for MLD traffic. It means that all radios of the AP cannot be performing off-channel scanning at the same time.

Figure 5:
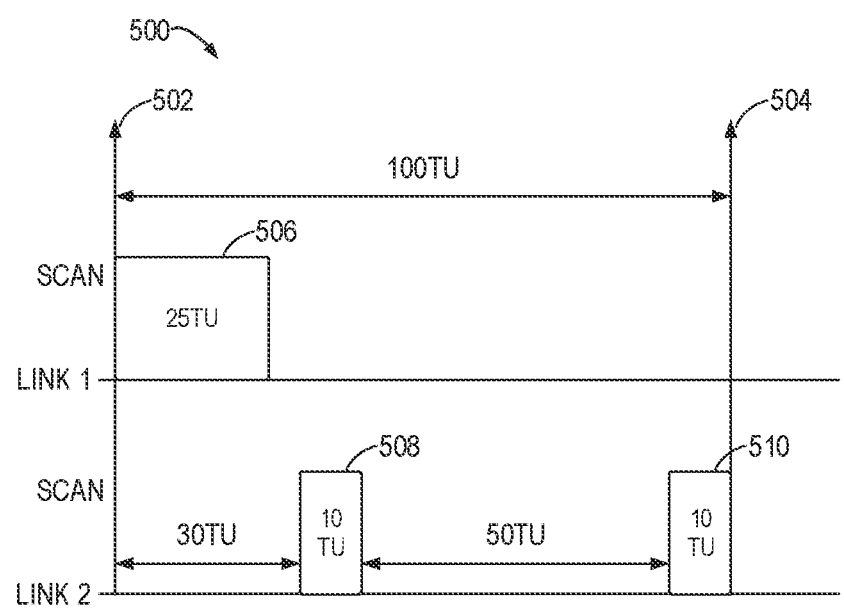
FIG. 5 is a schematic diagram illustrating an example of performing scans on multiple links while ensuring that at least one link is available for traffic at the radio level according to the implementations of the present disclosure.

FIG. 5 is a schematic diagram illustrating an example 500 of performing scans on two links while ensuring that at least one link is available for traffic at radio level according to the implementations of the present disclosure. As shown in FIG. 5, the example 500 includes an AP MLD with two links (the link 1 and the link 2). Scan 506 may be performed on the link 1, where the offset of scan 506 is 0 and the dwell time is 25 TU. As shown in FIG. 5, the beacon transmission times are time 502 (0) and 504 (100 TU), the time range of the scan 506 is from 0 to 25 TU. In order to keep at least one active link, the scans on the link 2 may not be scheduled from 0 to 25 TU because the link 1 is inactive in that time period. In the example 500, there are two scans 508 and 510 on the link 2, and the dwell time is 10 TU. The offset of the scan 508 is 30 TU, therefore the time range of the scan 508 is from 30 TU to 40 TU. The offset of the scan 510 is 90 TU, therefore the time range of the scan 510 is from 90 TU to 100 TU. In the example 500, the link 1 is inactive from 0 to 25 TU, and the link 2 is inactive from 30 TU to 40 TU and from 90 TU to 100 TU, such that there is always at least one active link from 0 to 100 TU in the example 500.

In the implementations with two MLD links, the time ranges of scans on a first link and the time ranges of scans on a second link should satisfy a limitation as shown in equation (5) at below:

$$[T_{scan-start-link\_i}, T_{scan-start-link\_i} + D_{link\_i}] \cap [T_{scan-start-link\_j}, T_{scan-start-link\_j} + D_{link\_j}] = \emptyset. \quad (5)$$

Where $T_{scan-start-link\_i}$ denotes the start time of a scan on the link i, $D_{link\_i}$ denotes the dwell time on the link i, $T_{scan-start-link\_j}$ denotes the start time of a scan on the link j, and $D_{link\_j}$ denotes the dwell time on the link j.

Figure 6A:
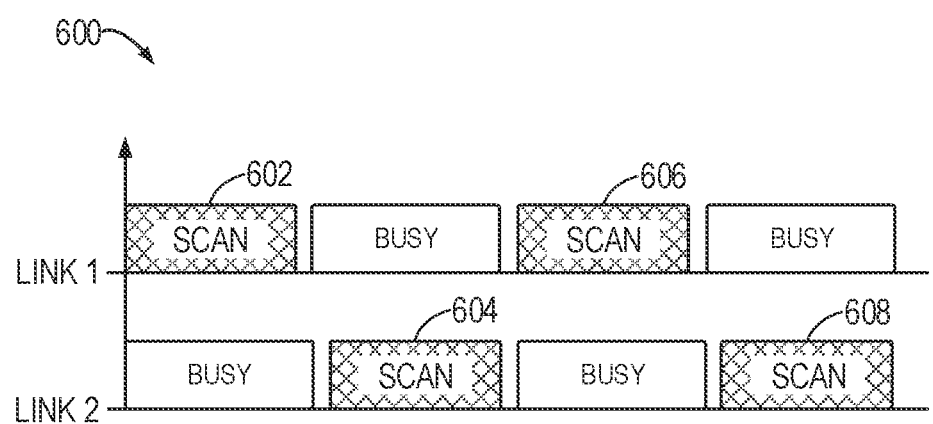
FIGS. 6A-6C are schematic diagrams illustrating examples of scanning models for an MLD with two links and an MLD with three links by using pipeline scheduling according to the implementations of the present disclosure.
Figure 6B:
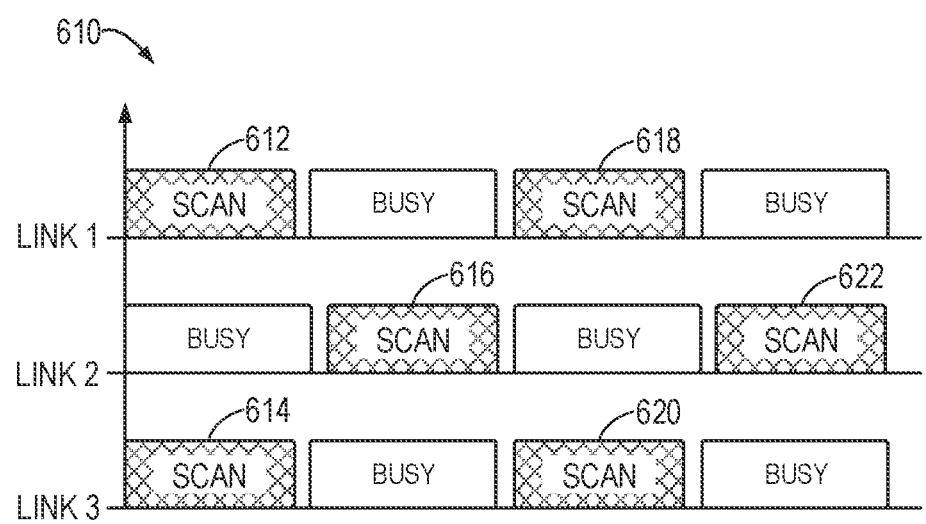
Figure 6C:
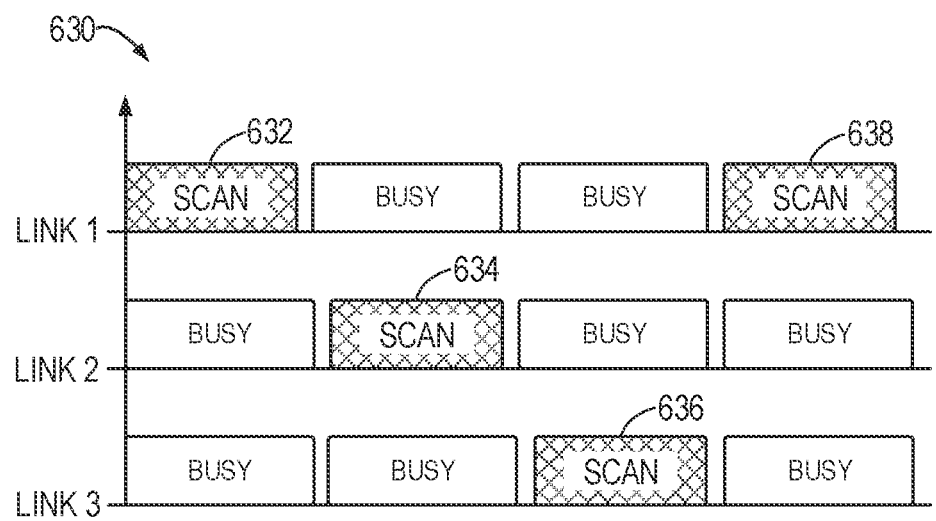

In some implementations, the time range of the scans may be organized using MLD Unified Media Access Control (UMAC) or higher-level control. For example, FIGS. 6A-6C show examples of scanning models for an MLD with two links and an MLD with three links by using pipeline scheduling according to the implementations of the present disclosure. As shown in FIG. 6A, the example 600 includes an AP MLD with two links (the link 1 and the link 2). The radio working on the link 1 may switch to other channels to perform scans 602 and 606, thus the link 1 is inactive during the time range of the scans 602 and 606. In the example 600, in order to keep at least one link active, the link 2 should be in busy status (which means having traffic or channel busy) during the time range of the scans 602 and 606. Similarly, the radio working on the link 2 may switch to other channels to perform scans 604 and 608, thus the link 2 is inactive during the time range of the scans 604 and 608. Therefore, in order to keep at least one link active, the link 1 should be in busy status during the time range of the scans 604 and 608.

FIG. 6B shows the example 610 of a scanning model for an MLD with three links. As shown in FIG. 6B, the example 610 includes an AP MLD with three links (the link 1, the link 2 and the link 3). The link 2 is in busy status when the radios working on the link 1 and the link 3 switch to other channels to perform the scans 612, 614, 618 and 620. The link 1 and the link 3 are in busy status when the radios working on the link 2 switch to other channels to perform the scans 616 and 622. Therefore, in the example 610, there is always one active link for the MLD traffic.

FIG. 6C shows the example 630 of a scanning model for an MLD with three links. As shown in FIG. 6C, the example 630 includes an AP MLD with three links (the link 1, the link 2 and the link 3). The link 2 and the link 3 are both in busy status when the radios working on the link 1 switches to other channels to perform the scans 632 and 638. The link 1 and the link 3 are both in busy status when the radios working on the link 2 switch to other channels to perform the scan 634. The link 1 and the link 2 are both in busy status when the radios working on the link 3 switch to other channels to perform the scan 636. Therefore, in the example 630, there are always two active links for the MLD traffic.

In this manner, there is always at least one link available for MLD traffic, and the traffic pending or traffic delay introduced by the scans can be reduced. Thus the performance of the network can be improved.

In some implementations, the AP and the monitor dongle (using USB port to connect with the AP, and working in monitor mode or normal working mode) may provide a radio for supporting full bands scanning and working. It means that the specific radio may perform 2.4G/5G/6G band scanning, and this radio can serve BSS services on the three bands. There are two types of MLD which are Enhanced Multi-Link Single-Radio (EMLSR) and Enhanced Multi-Link Multi-Radio (EMLMR), and both of them may be used for scanning cooperation.

In some implementations, the multi-band scanning cooperation may be implemented by supporting out-of-band scanning. In these implementations, the specific radio may work with radios working on other bands or other MLD links to perform scanning on a same channel or different channels, which reduces the total scan scheduling time for full band channel scanning. In some implementations, when the specific radio works with radios working on other bands or other MLD links to perform scanning on a same channel, the dwell time of the other radios may be split into a first scan time and a second scan time. The specific radio may perform scanning on a target channel for the first scan time; and the other radio may perform scanning on the target channel for the second scan time. In some implementations, the multi-band scanning cooperation may be implemented by supporting out-of-band working. In these implementations, the specific radio may work for radios working on other bands or other MLD links when these radios have scanning demands.

Figure 7:
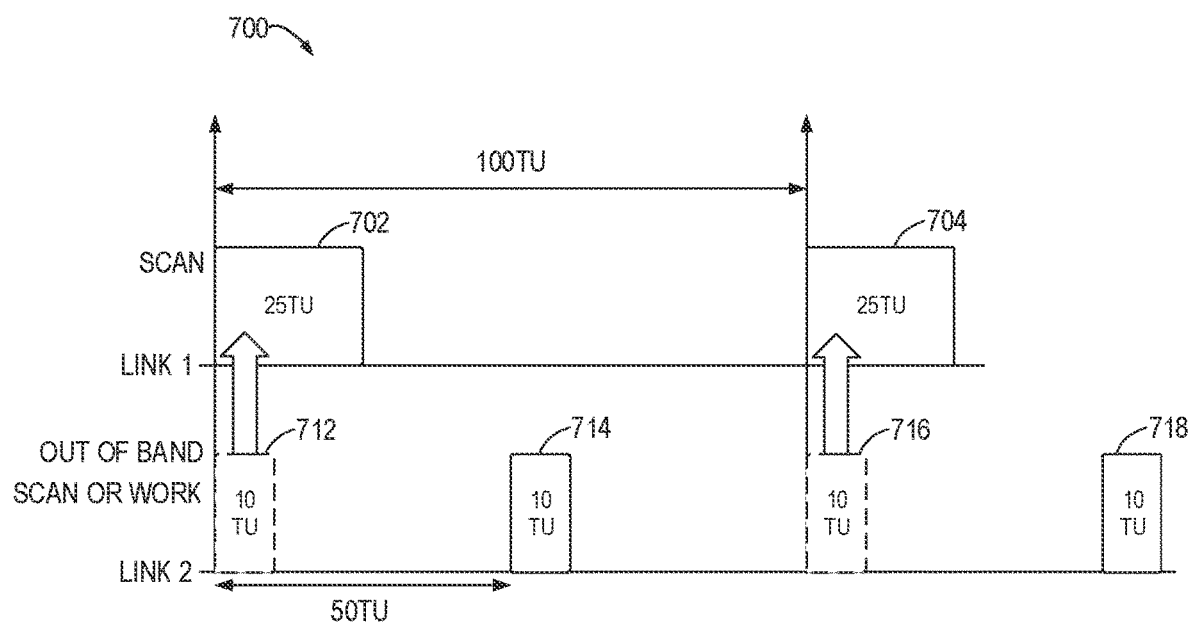
FIG. 7 is a schematic diagram illustrating an example of multi-band scanning cooperation according to the implementations of the present disclosure.

FIG. 7 is a schematic diagram illustrating an example 700 of multi-band scanning cooperation according to the implementations of the present disclosure. As shown in FIG. 7, the example 700 includes an AP MLD with two links (the link 1 and the link 2). The radio working on the link 1 performs scans 702 and 704 on a target channel, and the radio working on the link 2 performs scans 712, 714, 716, and 718 on other channels. In the example 700, the radio working on the link 2 supports out-of-band scanning and working. Therefore, the dwell time of scan 702 (25 TU) can be split into 10 TU and 15 TU, and the radio working on the link 2 may cooperate with the radio working on the link 1 by performing a scan on the target channel for 10 TU. Thus the radio working on the link 1 may perform scan on the target channel for 15 TU instead of 25 TU.

In this manner, the radio working on the idler link can assist radios on other links in performing off-channel scanning, thereby reducing the time that the other radios spend performing off-channel scanning. This, in turn, reduces latency on those links and improves overall network performance.

In some situations, the channel scan request (e.g., the channel scan request 134 in FIG. 1) should be rejected or suspended by the AP (e.g., the AP 102 in FIG. 1) for some reason. In some implementations, the AP may determine whether the current link is the only one active link for MLD traffic. If the current link is the only one active link, then the AP may reject or suspend the channel scan request. In some implementations, the AP may determine a scan time range on the current link. If the scan time range overlaps with out-of-service time for other links, the AP may reject or suspend the channel scan request. In some implementations, The AP may determine whether the radio working on the current link needs to cooperate with radios working on other links for MLD features such as Transmit Opportunity and Simultaneous Transmission and Receive mode (sync multi-link multi-radio). If the radio working on the current link needs to cooperate with other radios, then the AP may reject or suspend the channel scan request. In this manner, it can ensure that there is always at least one active link for MLD traffic, and the radio supporting out-of-band scanning can assist other radios in performing off-channel scanning.

Figure 8:
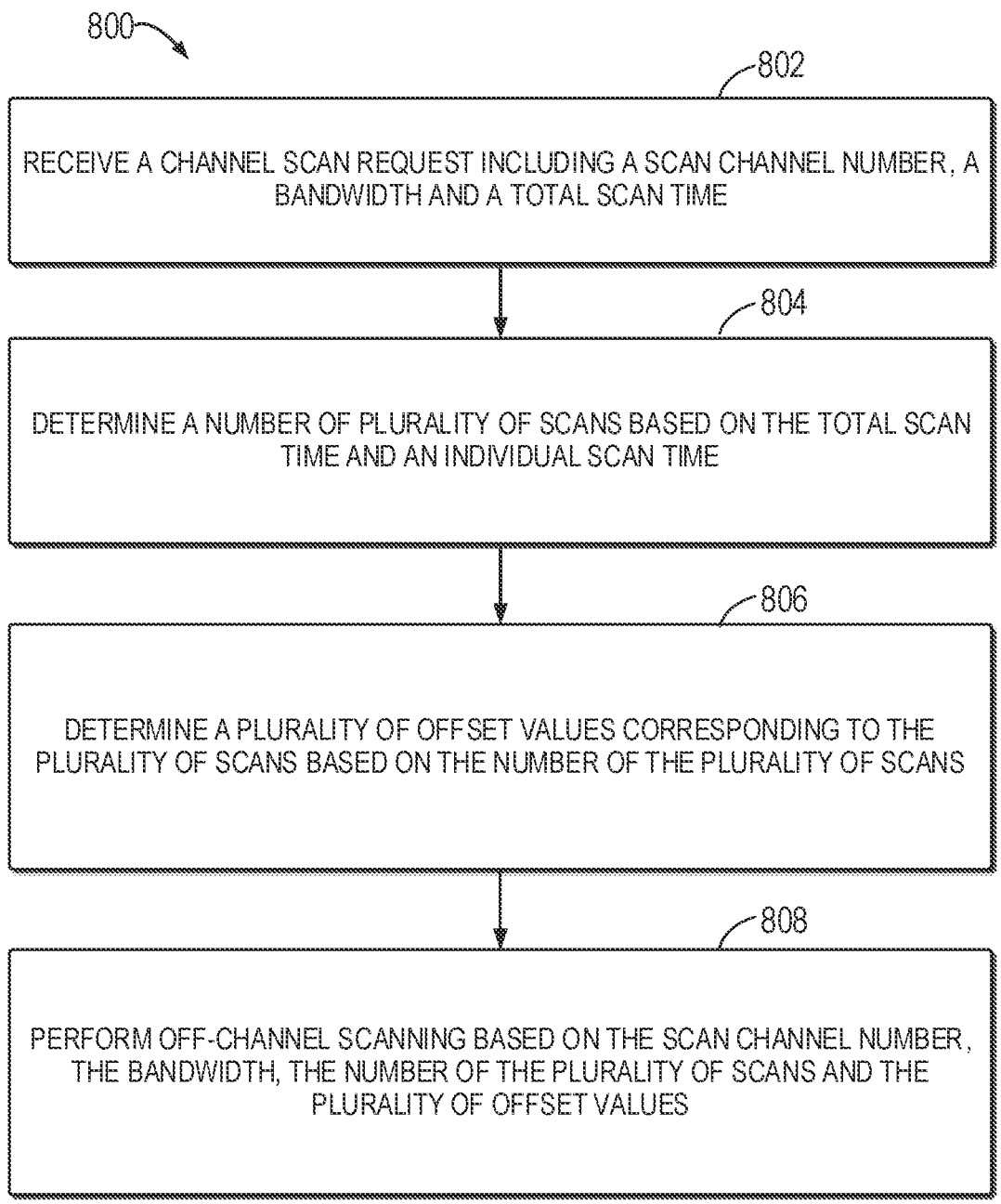
FIG. 8 is a flow chart illustrating a method for scanning enhancement according to implementations of the present disclosure.

FIG. 8 is a flow chart illustrating a method 800 for scanning enhancement according to implementations of the present disclosure. The method 800 may be performed by the AP 102 as shown in FIG. 1. As shown in FIG. 8, at block 802, the method 800 receives a channel scan request including a scan channel number, a bandwidth and a total scan time, and the total scan time is greater than a TBTT of a neighbor BSS. For example, in the environment 100 as shown in FIG. 1, the AP 102 may receive the channel scan request 134 including the scan channel number 136, the bandwidth 138, and the total scan time 140. For example, the scan channel number 136 may be channel 38, the bandwidth 138 may be 5G, and if the TBTT of the neighbor BSS (e.g., the TBTT 116 of the OBSS 114 in FIG. 1) is 100 ms, the total scan time 140 may be 110 ms.

At block 804, the method 800 determines a number of plurality of scans based on the total scan time and an individual scan time. For example, as shown in FIG. 2, the dwell time (i.e., the individual scan time) for the AP may be 30 ms, and the process 200 needs to determine a number of plurality of scans based on the dwell time (30 ms) to fulfill the total scan time (110 ms). Thus, the process 200 determines that it needs four scans (scans 212, 214, 216, and 218) to make sure the sum of time for the scans is greater than or equal to the total scan time.

At block 806, the method 800 determines a plurality of offset values corresponding to the plurality of scans based on the number of the plurality of scans. For example, as shown in FIG. 2, the process 200 determines the offset 222 for the scan 212, the offset 224 for the scan 214, the offset 226 for the scan 216 and the offset 228 for the scan 218. For example, the value of the offset 222 may be 0, the value of the offset 224 may be 30 ms, the value of the offset 226 may be 60 ms, and the value of the offset 228 may be 90 ms.

At block 808, the method 800 performs off-channel scanning based on the scan channel number, the bandwidth, the number of the plurality of scans, and the plurality of offset values. For example, the channel number may be channel 38, the bandwidth may be 5G, the number of the plurality of scans may be four, and the plurality of offset values may be 0, 30 ms, 60 ms, and 90 ms. Refer to FIG. 2, the AP may switch to the channel 38 of 5G bandwidth to perform the scan 212 at time 202 for 30 ms, perform the scan 214 at 30 ms after time 204 for 30 ms, perform the scan 216 at 60 ms after time 206 for 30 ms, and perform the scan 218 at 90 ms after time 208 for 30 ms. As shown in FIG. 2, the AP may capture the beacons of OBSS 1 during the scan 212, and may capture the beacons of OBSS 2 during the scan 214.

In this manner, no matter when the beacons in the neighbor BSS are transmitted, and no matter how long the dwell time is, the scheme provided by the implementations of the present disclosure can ensure that the beacons in the neighbor BSS can be captured by the AP within a certain number of scans, thus the effect and the efficient of the scanning process can be improved. Because the scanning process is enhanced, the performance of the features of the upper layer and the user experience can be improved as well.

Figure 9:
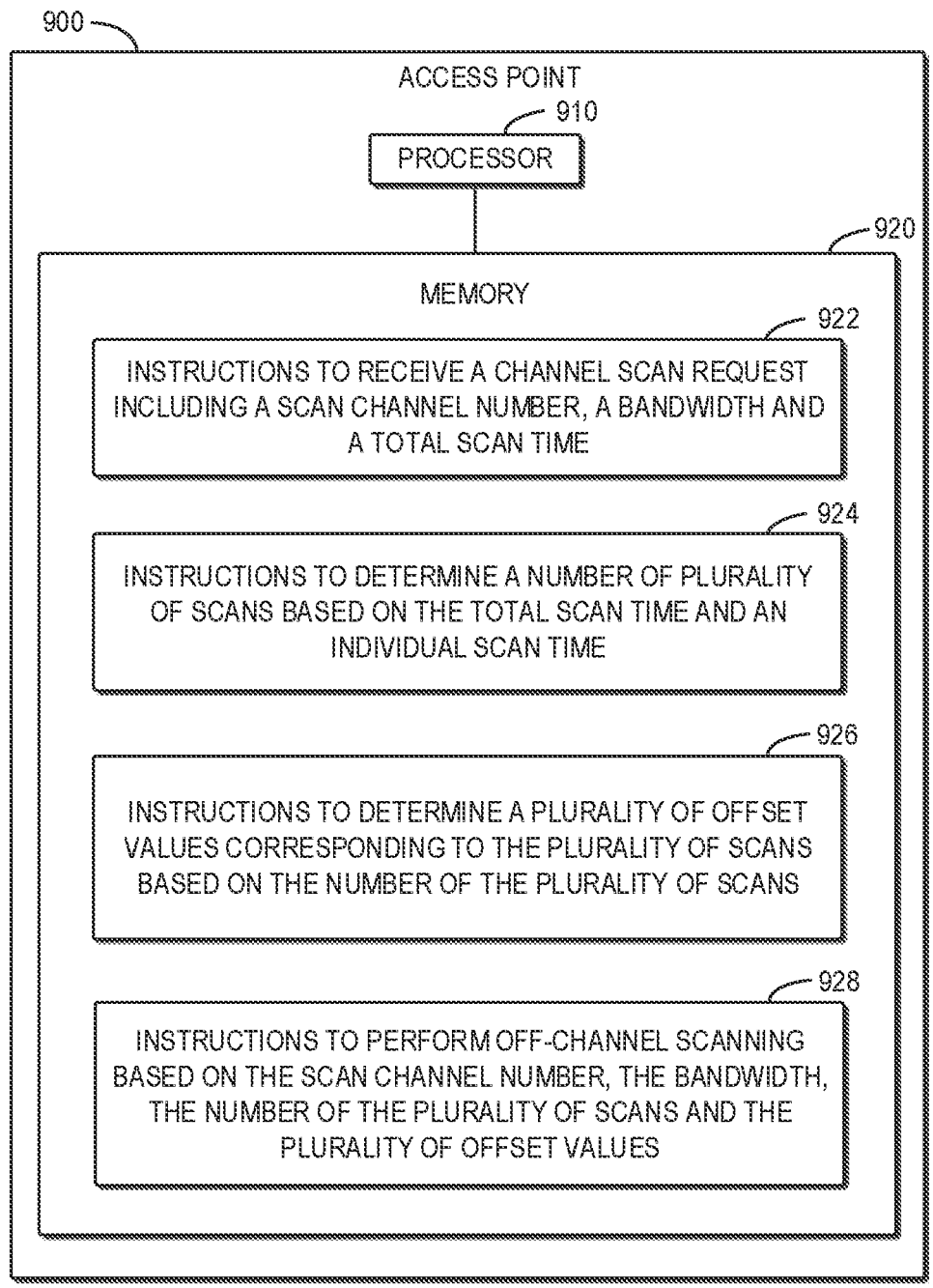
FIG. 9 is a diagram illustrating an example access point according to the implementations of the present disclosure.

FIG. 9 is a diagram illustrating an example access point 900 according to the implementations of the present disclosure. As shown in FIG. 9, the access point 900 comprises at least one processor 910, and a memory 920 coupled to the at least one processor 910. The memory 920 stores instructions 922, 924, 926 and 928 to cause the processor 910 to perform actions according to example implementations of the present disclosure.

As shown in FIG. 9, the memory 920 stores instructions 922 to receive a channel scan request, including a scan channel number, a bandwidth, and a total scan time. The memory 920 further stores instructions 924 to determine a number of plurality of scans based on the total scan time and an individual scan time. The memory 920 further stores instructions 926 to determine a plurality of offset values corresponding to the plurality of scans based on the number of the plurality of scans. The memory 920 further stores instructions 928 to perform off-channel scanning based on the scan channel number, the bandwidth, the number of the plurality of scans, and the plurality of offset values.

The stored instructions and the functions that the instructions may perform can be understood with reference to implementations as described above. For brevity, the details of instructions 922, 924, 926, and 928 will not be discussed herein.

Figure 10:
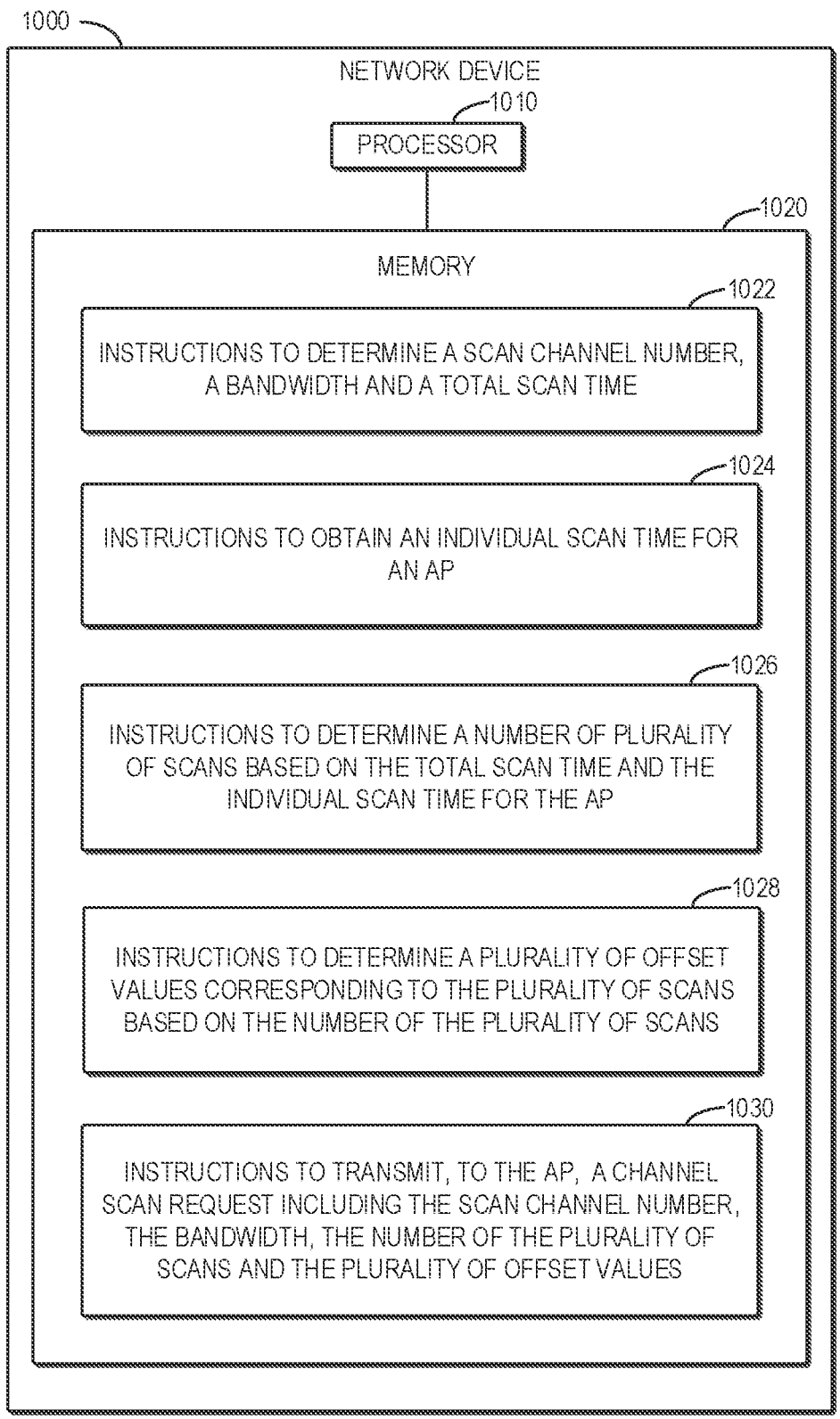
FIG. 10 is a diagram illustrating an example network device according to the implementations of the present disclosure.

FIG. 10 is a diagram illustrating an example network device 1000 according to the implementations of the present disclosure. As shown in FIG. 10, the network device 1000 comprises at least one processor 1010, and a memory 1020 coupled to the at least one processor 1010. The memory 1020 stores instructions 1022, 1024, 1026, 1028, and 1030 to cause the processor 1010 to perform actions according to example implementations of the present disclosure.

As shown in FIG. 10, the memory 1020 stores instructions 1022 to determine a scan channel number, a bandwidth and a total scan time, the total scan time being greater than a TBTT of a neighbor BSS. The memory 1020 further stores instructions 1024 to obtain an individual scan time for an AP. The memory 1020 further stores instructions 1026 to determine a number of a plurality of scans based on the total scan time and the individual scan time for the AP. The memory 1020 further stores instructions 1028 to determine a plurality of offset values corresponding to the plurality of scans based on the number of the plurality of scans. The memory 1020 further stores instructions 1030 to transmit a channel scan request, including the scan channel number, the bandwidth, the number of the plurality of scans, and the plurality of offset values to the AP.

In some implementations, when the network device 1000 is determining the number of the plurality of scans, the sum of time of the plurality of scans should be greater than or equal to the total scan time, such that the scan time ranges of the scans can fulfill the total scan time. For example, if the total scan time is 110 ms and the dwell time is 30 ms, then the number of the plurality of scans should be greater than or equal to four.

In some implementations, the network device 1000 may tune the dwell time for the AP based on the traffic type of the traffic associated with the AP. In these implementations, because longer dwell time brings larger latency, the dwell time for the traffic which is insensitive to latency may be greater than or equal to the dwell time for the traffic which is sensitive to latency. Therefore, the dwell time for the best-effort traffic may be greater than or equal to the dwell time for the background traffic, the dwell time for the background traffic may be greater than or equal to the dwell time for the video traffic, and the dwell time for the video traffic may be greater than or equal to the dwell time for the voice traffic.

This manner ensures that the beacons of the OBSSs can be captured by the AP. Furthermore, for latency-sensitive traffic, the AP may switch to other channels for a shorter dwell time. Therefore, the latency can be decreased, and the user experience can be improved. For latency-insensitive traffic, the AP may switch to other channels for a longer dwell time and the number of scans can be decreased. By this way, the unavoidable switching time consumption can be reduced, and the performance of the network can be improved.

The stored instructions and the functions that the instructions may perform can be understood with reference to implementations as described above. For brevity, the details of instructions 1022, 1024, 1026, 1028, and 1030 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
    receiving, by an access point (AP) and from a network device, a channel scan request including a scan channel number, a bandwidth, and a total scan time, the total scan time being greater than a target beacon transmission time (TBTT) of a neighbor basic service set (BSS);
    determining, by the AP, a number of a plurality of scans based on the total scan time and an individual scan time for the AP, the individual scan time indicating an amount of time that the AP stays on a channel during a scanning process;
    determining, by the AP, a plurality of offset values corresponding to the plurality of scans based on the number of the plurality of scans; and
    performing, by the AP, off-channel scanning based on the scan channel number, the bandwidth, the number of the plurality of scans and the plurality of offset values.

2. The method of claim 1, wherein performing off-channel scanning comprises:
    performing a first scan of the plurality of scans with a first offset value of the plurality of offset values on a target channel indicated by the scan channel number and the bandwidth; and
    performing a second scan of the plurality of scans with a second offset value of the plurality of offset values on the target channel,
    wherein the plurality of offset values is less than the TBTT of the neighbor BSS.

3. The method of claim 2, further comprising:
    in response to determining that the AP needs to transmit a beacon on a home channel, interrupting performance of a third scan.

4. The method of claim 1, wherein determining the number of the plurality of scans comprises:
    determining a sum of time of the plurality of scans, the sum of time being greater than or equal to the total scan time.

5. The method of claim 1, further comprising:
    determining a traffic type of a traffic flow associated with the AP; and
    determining the individual scan time for the traffic flow based on the traffic type of the traffic flow.

6. The method of claim 5, wherein determining the individual scan time for the traffic flow comprises:
    in response to determining that the traffic type of the traffic flow is best-effort, determining a first individual scan time for the traffic flow;
    in response to determining that the traffic type of the traffic flow is background, determining a second individual scan time for the traffic flow;
    in response to determining that the traffic type of the traffic flow is video, determining a third individual scan time for the traffic flow; or
    in response to determining that the traffic type of the traffic flow is voice, determining a fourth individual scan time for the traffic flow,
    wherein the first individual scan time is greater than or equal to the second individual scan time, the second individual scan time is greater than or equal to the third individual scan time, and the third individual scan time is greater than or equal to the fourth individual scan time.

7. The method of claim 5, wherein the TBTT of the neighbor BSS is a first TBTT, and determining the individual scan time for the traffic flow further comprises:
    determining the individual scan time for the traffic flow based on a second TBTT of a second BSS managed by the AP and the traffic type of the traffic flow,
    wherein the individual scan time is less than or equal to the second TBTT.

8. The method of claim 1, further comprising:
    determining a proportion of Ethernet clients on a link to all clients on the link;
    determining that the proportion is greater than a predefined threshold value;
    determining a scan time greater than or equal to a second TBTT of a second BSS managed by the AP as the individual scan time; and
    tuning traffic of all clients on the link to other links by applying traffic identifier-to-link mapping.

9. The method of claim 1, wherein determining the plurality of offset values comprises:
    determining a set of scan time ranges on all links of the AP;
    determining a candidate scan time range based on a candidate offset value and the individual scan time;
    determining that the candidate scan time range does not overlap with each scan time range of the set of scan time ranges; and
    determining the candidate offset value as one of the plurality of offset values.

10. The method of claim 1, wherein performing off-channel scanning further comprises:
    splitting the individual scan time into a first scan time and a second scan time;

performing, by a first radio of the AP, off-channel scanning on a target channel indicated by the scan channel number and the bandwidth for the first scan time; and performing, by a second radio of the AP, off-channel scanning on the target channel for the second scan time.

11. The method of claim 1, further comprising:

determining that all links are currently inactive for multi-link device traffic; and suspending the channel scan request.

12. The method of claim 1, further comprising:

determining a scan time range on a first link;

determining that the scan time range overlaps with out of service time for a second link; and suspending the channel scan request.

13. An access point (AP) comprising:

at least one processor; and a memory coupled to the at least one processor, the memory storing instructions to cause the at least one processor to:
- receive, from a network device, a channel scan request including a scan channel number, a bandwidth, and a total scan time, the total scan time being greater than a target beacon transmission time (TBTT) of a neighbor basic service set (BSS);
- determine a number of a plurality of scans based on the total scan time and an individual scan time for the AP, the individual scan time indicating an amount of time that the AP stays on a channel during a scanning process;
- determine a plurality of offset values corresponding to the plurality of scans based on the number of the plurality of scans; and
- perform off-channel scanning based on the scan channel number, the bandwidth, the number of the plurality of scans and the plurality of offset values.

14. The AP of claim 13, wherein the instructions to perform off-channel scanning comprise instructions to cause the at least one processor to:
- perform a first scan of the plurality of scans with a first offset value of the plurality of offset values on a target channel indicated by the scan channel number and the bandwidth; and
- perform a second scan of the plurality of scans with a second offset value of the plurality of offset values on the target channel,
- wherein the plurality of offset values is less than the TBTT of the neighbor BSS.

15. The AP of claim 14, wherein the memory further stores instructions to cause the at least one processor to:
- in response to determining that the AP needs to transmit a beacon on a home channel, interrupt performance of a third scan.

16. The AP of claim 13, wherein the instructions to determine the number of the plurality of scans comprise instructions to cause the at least one processor to:
- determine a sum of time of the plurality of scans, the sum of time being greater than or equal to the total scan time.

17. The AP of claim 13, wherein the memory further stores instructions to cause the at least one processor to:
- determine a traffic type of a traffic flow associated with the AP; and
- determine the individual scan time for the traffic flow based on the traffic type of the traffic flow.

18. The AP of claim 17, wherein the instructions to determine the individual scan time for the traffic flow comprise instructions to cause the at least one processor to:
- in response to determining that the traffic type of the traffic flow is best-effort, determine a first individual scan time for the traffic flow;
- in response to determining that the traffic type of the traffic flow is background, determine a second individual scan time for the traffic flow;
- in response to determining that the traffic type of the traffic flow is video, determine a third individual scan time for the traffic flow; or
- in response to determining that the traffic type of the traffic flow is voice, determine a fourth individual scan time for the traffic flow,
- wherein the first individual scan time is greater than or equal to the second individual scan time, the second individual scan time is greater than or equal to the third individual scan time, and the third individual scan time is greater than or equal to the fourth individual scan time.

19. The AP of claim 17, wherein the TBTT of the neighbor BSS is a first TBTT, and the instructions to determine the individual scan time for the traffic flow further comprise instructions to cause the at least one processor to:
- determine the individual scan time for the traffic flow based on a second TBTT of a second BSS managed by the AP and the traffic type of the traffic flow,
- wherein the individual scan time is less than or equal to the second TBTT.

20. A network device, comprising:

at least one processor; and a memory coupled to the at least one processor, the memory storing instructions to cause the at least one processor to:
- determine a scan channel number, a bandwidth and a total scan time being greater than a target beacon transmission time (TBTT) of a basic service set (BSS);
- obtain an individual scan time for an access point (AP), the individual scan time indicating an amount of time that the AP stays on a channel during a scanning process;
- determine a number of a plurality of scans based on the total scan time and the individual scan time for the AP;
- determine a plurality of offset values corresponding to the plurality of scans based on the number of the plurality of scans; and
- transmit, to the AP, a channel scan request including the scan channel number, the bandwidth, the number of the plurality of scans, and the plurality of offset values.

* * * * *